United States Patent
Cha et al.

(10) Patent No.: US 10,855,959 B2
(45) Date of Patent: Dec. 1, 2020

(54) IMAGE SENSING DEVICE

(71) Applicant: SK hynix Inc., Icheon-si (KR)

(72) Inventors: Su-Ram Cha, Seoul (KR); Tae-Hyun Kim, Seongnam-si (KR); Seong-Hee Park, Yongin-si (KR); Chang-Hee Pyeoun, Seoul (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/122,024

(22) Filed: Sep. 5, 2018

(65) Prior Publication Data

US 2019/0222812 A1 Jul. 18, 2019

(30) Foreign Application Priority Data

Jan. 15, 2018 (KR) .................. 10-2018-0005257

(51) Int. Cl.
*H04N 9/04* (2006.01)
*H04N 9/64* (2006.01)
*H04N 5/345* (2011.01)
*H04N 5/369* (2011.01)
*G06T 3/40* (2006.01)
*H01L 27/146* (2006.01)

(52) U.S. Cl.
CPC ........ *H04N 9/0451* (2018.08); *H04N 9/0455* (2018.08); *H04N 9/04515* (2018.08); *H04N 9/04557* (2018.08); *H04N 9/64* (2013.01)

(58) Field of Classification Search
CPC .... H04N 9/04551; H04N 9/64; H04N 9/0455; H04N 9/04557; H04N 5/345; H04N 5/369; H04N 9/0451; G06T 3/4015; G06T 3/4038; G06T 2200/32; G06T 3/4069; G02B 3/0006; H01L 27/146

USPC ........... 348/222.1, 272, 280, 273, 294, 308; 382/167, 300, 162, 166; 257/291, 292, 257/258, 294; 250/553, 208.1, 226
See application file for complete search history.

(56) References Cited

U.S. PATENT DOCUMENTS

| 3,971,065 | A | 7/1976 | Bayer | |
|---|---|---|---|---|
| 6,989,862 | B2* | 1/2006 | Baharav | G06T 3/4015 348/273 |
| 9,184,195 | B2* | 11/2015 | Hayashi | H04N 5/228 348/277 |
| 9,451,221 | B2* | 9/2016 | Hirota | H04N 9/045 348/361 |
| 2002/0149687 | A1* | 10/2002 | Jaspers | G06T 3/4015 348/223.1 |
| 2003/0117507 | A1* | 6/2003 | Kehtarnavaz | H04N 9/045 348/242 |

(Continued)

FOREIGN PATENT DOCUMENTS

| CN | 102025926 A | 4/2011 |
|---|---|---|
| CN | 102957917 A | 3/2013 |

*Primary Examiner* — Marly S Camargo
(74) *Attorney, Agent, or Firm* — Perkins Coie LLP

(57) ABSTRACT

An image sensing device includes a pixel array of a 4×4 pixel unit including first to fourth sub-pixel arrays of 2×2 pixels. The first and second sub-pixel arrays are arranged in a first diagonal direction, and the third and fourth sub-pixel arrays are arranged in a second diagonal direction intersecting the first diagonal direction. The first and second sub-pixel arrays have a first color pattern, and the third and fourth sub-pixel arrays have second and third color patterns, respectively, and each of the first to third color patterns includes two or more colors.

24 Claims, 5 Drawing Sheets

(56) References Cited

U.S. PATENT DOCUMENTS

| | | | |
|---|---|---|---|
| 2005/0088535 A1* | 4/2005 | Hatano | H04N 5/23293 |
| | | | 348/220.1 |
| 2010/0254602 A1* | 10/2010 | Yoshino | G06T 3/0018 |
| | | | 382/167 |
| 2011/0050918 A1* | 3/2011 | Tachi | H04N 5/228 |
| | | | 348/204.4 |
| 2012/0025060 A1* | 2/2012 | Iwata | H01L 27/146 |
| | | | 250/208.1 |
| 2013/0027437 A1* | 1/2013 | Gu | G06G 5/10 |
| | | | 345/690 |
| 2013/0077861 A1 | 3/2013 | Kim | |
| 2013/0216130 A1* | 8/2013 | Saito | G06K 9/4671 |
| | | | 2/165 |
| 2014/0253808 A1 | 9/2014 | Tachi | |
| 2014/0307135 A1* | 10/2014 | tanaka | H04N 9/07 |
| | | | 348/280 |
| 2015/0350575 A1* | 12/2015 | Agranov | H04N 5/37457 |
| | | | 348/302 |
| 2017/0092166 A1* | 3/2017 | Choi | G09G 3/006 |
| | | | 345/205 |
| 2017/0109865 A1* | 4/2017 | Kim | G06T 3/4069 |
| | | | 348/373 |
| 2018/0357750 A1* | 12/2018 | Chen | G06T 3/4015 |
| | | | 382/167 |
| 2019/0259795 A1* | 8/2019 | Jang | H01L 27/14621 |
| | | | 257/294 |

\* cited by examiner

| B1 | G | B2 | G | B3 |
|----|----|----|----|----|
| G | R | G1 | R | G |
| B4 | G2 | Rt | G3 | B5 |
| G | Bt | G4 | R | G |
| B6 | G | B7 | G | B8 |

IMAGE SENSING DEVICE

CROSS-REFERENCE TO RELATED APPLICATIONS

This patent document claims the priority and benefits of Korean Patent Application No. 10-2018-0005257, filed on Jan. 15, 2018, which is incorporated herein by reference in its entirety.

TECHNICAL FIELD

The technology and implementations disclosed in this patent document relate generally to semiconductor devices and integrated circuits including image sensing devices.

BACKGROUND

An image sensing device is a sensor that captures images using photosensitive properties of semiconductors. Image sensing devices are often classified into charge-coupled device (CCD) image sensors and complementary metal-oxide semiconductor (CMOS) image sensors. CMOS image sensors are fabricated based on CMOS integrated circuit fabrication process. This feature of CMOS image sensors makes it possible to integrate both analog and digital control circuits in a single integrated circuit (IC), making CMOS image sensors the most widely used type of image sensor.

SUMMARY

This patent document provides, among others, designs of image sensing devices that have optimized performance in a low illumination mode and a high illumination mode.

In one example aspect, the disclosed technology can be implemented to provide an image sensing device that includes: a pixel array of a 4×4 pixel unit including first to fourth sub-pixel arrays of 2×2 sub-pixel arrays, the first and second sub-pixel arrays being arranged in a first diagonal direction, the third and fourth sub-pixel arrays being arranged in a second diagonal direction intersecting the first diagonal direction, wherein the first and second sub-pixel arrays have a first color pattern, the third sub-pixel array has a second color pattern, the fourth sub-pixel array has a third color pattern different from the second color pattern, and each of the first to third color patterns includes two or more colors.

The first color pattern may be different from the second and third color patterns.

The first color pattern may include a Bayer pattern.

Color pixels of the first color pattern may be arranged such that each 2×2 sub-pixel array has a pair of green color pixels arranged in the first diagonal direction or the second diagonal direction, and a red color pixel and a blue color pixel arranged in a diagonal direction intersecting the diagonal direction in which the pair of green color pixels are arranged.

Color pixels of each of the second and third color patterns may be arranged such that each 2×2 sub-pixel array has a pair of green color pixels arranged in the same diagonal direction as the diagonal direction in which the pair of green color pixels are arranged in the first color pattern, and a pair of blue color pixels or a pair of red color pixels arranged in a diagonal direction intersecting the direction in which the pair of green color pixels are arranged.

One pixel of each of the second and third color patterns may have a different color from the first color pattern.

Pixels disposed immediately adjacent to each other in the first diagonal direction may have the same color as each other.

Each pixel included in the pixel array of the 4×4 pixel unit may have a different color from vertically and horizontally adjacent pixels.

The pixel array of the 4×4 pixel unit may include one or more green color pixels, one or more red color pixels, and one or more blue color pixels, and wherein a ratio of the green color pixel, the red color pixel and the blue color pixel in the pixel array of the 4×4 pixel unit may be 2:1:1.

The image sensing device may further include: a readout circuit suitable for reading out pixel signals from the pixel array; and an image processing circuit suitable for generating a first image frame converted into a different pattern from the pixel array of the 4×4 pixel unit through a summation operation based on the pixel signals, in a low illumination mode.

The image processing circuit may include: a summation block suitable for combining pixel signals from the same color pixels for each sub-pixel array among the pixel signals to generate a pre-image frame, which is a downscaled image, in the low illumination mode; and a recovery block suitable for upscaling the pre-image frame to generate the first image frame in the low illumination mode.

The image processing circuit may combine two pixel signals having the same color for each sub-pixel array among the pixel signals.

The image processing circuit may combine two pixel signals corresponding to a green color among four pixel signals that are read out from the first sub-pixel array, combines two pixel signals corresponding to a green color among four pixel signals that are read out from the second sub-pixel array, combines two pixel signals corresponding to a red color among four pixel signals that are read out from the third sub-pixel array, and combines two pixel signals corresponding to a blue color among four pixel signals that are read out from the fourth sub-pixel array.

The image processing circuit may generate a second image frame converted into a different pattern through an interpolation operation based on the pixel signals, in a high illumination mode.

The image processing circuit may include: a calculation block suitable for calculating gradients of target pixel signals among the pixel signals in the high illumination mode; and an interpolation block suitable for performing an interpolation for the target pixel signals based on the gradients to generate the second image frame in the high illumination mode.

The first color pattern may include a Bayer pattern; and the image processing circuit may interpolate two pixel signals among 16 pixel signals that are read out from the pixel array of the 4×4 pixel unit and bypasses an image processing with respect to remaining 14 pixel signals to generate the second image frame in the high illumination mode.

The two pixel signals may include one pixel signal corresponding to a red color and one pixel signal corresponding to a blue color.

The image sensing device may further include: a readout circuit suitable for reading out pixel signals from the pixel array; and an image processing circuit suitable for generating an image frame converted into a different pattern from the pixel array of the 4×4 pixel unit through an interpolation operation based on the pixel signals in a high illumination mode.

The image processing circuit may include: a calculation block suitable for calculating gradients of target pixel signals among the pixel signals; and an interpolation block suitable for performing an interpolation for the target pixel signals based on the gradients to generate the image frame.

The first color pattern may include a Bayer pattern; and the image processing circuit may interpolate two pixel signals among 16 pixel signals that are read out from the pixel array of the 4×4 pixel unit and bypasses an image processing with respect to remaining 14 pixel signals so as to generate the image frame in the high illumination mode.

The two pixel signals may include one pixel signal corresponding to a red color and one pixel signal corresponding to a blue color.

In another example aspect, the disclosed technology can be implemented to provide an image sensing device that includes: a pixel array including sub-pixel arrays arranged in i rows and j columns, in which Aij, Bij, Cij and Dij (where i and j are integers) pixels are arranged in 2×2 units, the Aij and Bij pixels and the Cij and Dij pixels are arranged adjacent to each other in a row direction, respectively, and the Aij and Cij pixels and the Bij and Dij pixels are arranged adjacent to each other in a column direction, respectively, wherein each of two pixels among the Aij, Bij, Cij and Dij pixels has a green color, and each of remaining two pixels has one or more colors other than the green color, and the remaining two pixels among the Aij, Bij, Cij and Dij pixels included in each of odd-numbered sub-pixel arrays or even-numbered sub-pixel arrays are disposed adjacent to each other in a diagonal direction and have the same color.

The odd-numbered sub-pixel arrays or the even-numbered sub-pixel arrays may be defined on a basis of the row direction or the column direction.

The same color may include a red color or a blue color.

In another example aspect, the disclosed technology can be implemented to provide an image sensing device that includes: a first type of light-sensitive elements sensitive in a green region of a spectrum of the light, arranged at every other element position along both a vertical direction and a horizontal direction; and a second type of light-sensitive elements sensitive in a red region of a spectrum of the light and a third type of light-sensitive elements sensitive in a blue region of a spectrum of the light, each of the second and third type of light-sensitive elements being arranged at an element position surrounded by four light-sensitive elements of the first type, wherein a part of the array of the second and third types of light-sensitive elements is arranged such that the second and third types of light-sensitive elements are alternately arranged along a plurality of first diagonal lines, and the other part of the array of the second and third types of light-sensitive elements is arranged such that two consecutive second types of light-sensitive elements and two consecutive third types of light-sensitive elements are alternately arranged along a plurality of second diagonal lines, each of which is arranged between two adjacent first diagonal lines.

BRIEF DESCRIPTION OF THE DRAWINGS

FIG. 3 is a set of diagrams comparing example patterns of 4×4 pixel units in accordance with an embodiment of the disclosed technology with their corresponding Bayer patterns.

FIG. 8 is a diagram for describing a gradient calculation step and an interpolation operation step shown in FIG. 7.

DETAILED DESCRIPTION

The disclosed image sensing technology can be implemented to provide an electronic device including an image sensor to improve signal-to-noise ratio (SNR) in a low illumination mode and support high-resolution pixels in a high illumination mode.

Various features and embodiments of the disclosed technology are described below with reference to the accompanying drawings.

Moreover, it is noted that the terminology used herein is selected for the purpose of describing the examples of the disclosed technology only and is not intended to limit the illustrated examples.

The drawings are not necessarily to scale and, in some instances, proportions may have been exaggerated in order to clearly illustrate features of the embodiments.

Figure 1:
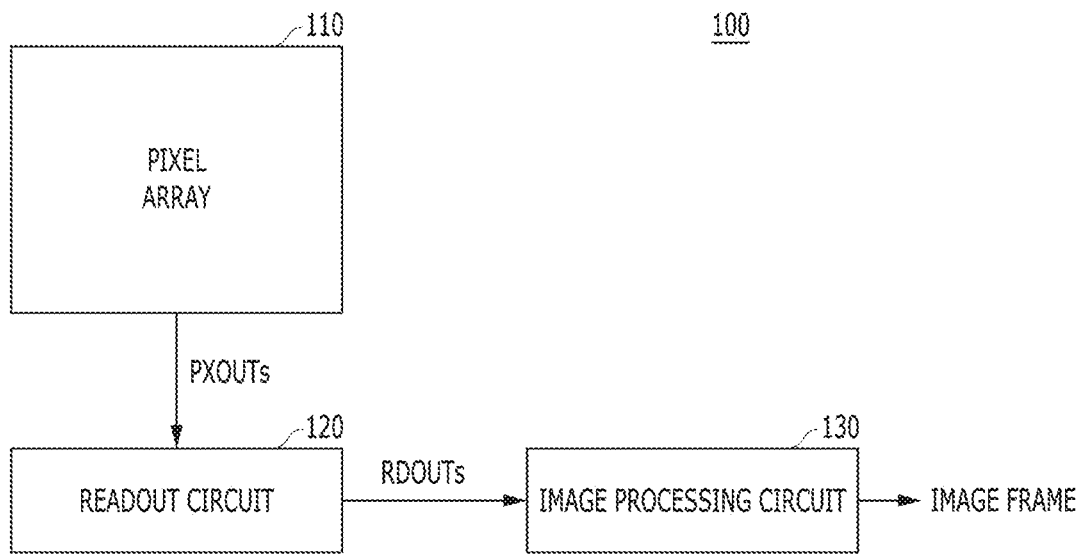
FIG. 1 is a block diagram illustrating an example of an image sensing device in accordance with an embodiment of the disclosed technology.

FIG. 1 is a block diagram illustrating an example of an image sensing device 100 in accordance with an embodiment of the disclosed technology.

Referring to FIG. 1, the image sensing device 100 may include a pixel array 110 of photosensing pixels, a readout circuit 120, and an image processing circuit 130.

The photosensing pixels (hereinafter "pixel") of the pixel array 110 may respond to incident light to generate pixel signals PXOUTs, which are analog signals, that correspond to and represent image features of a sensed image. Each pixel may be implemented by a photo diode, a photo transistor, a photo gate, a PPD (Pinned Photo Diode) or other photosensitive circuitry capable of converting light into a pixel signal (e.g., a charge, a voltage or a current). On top of the pixels, an array of different color filters are placed to cover the pixels to filter the incident light in different colors at different pixel locations to capture the color information in a sensed image.

The readout circuit 120 is coupled to the pixels of the pixel array 110 to receive and condition the generated pixel signals PXOUTs to generate image signals RDOUTs, which are digital signals, based on and corresponding to the pixel signals PXOUTs.

The image processing circuit 130 is coupled to the readout circuit 120 to receive the digital image signals RDOUTs and to process the received digital image signals RDOUTs to produce an image frame corresponding to the sensed image based on the image signals RDOUTs. The image processing circuit 130 can be structured to perform different digital signal processing on the received digital image signals RDOUTs. For example, the image processing circuit 130 may generate a converted image frame, which is converted into a different pattern from the pixel array 110 through a summation operation based on the image signals RDOUTs in a low illumination mode due to the nature of the summation operation. The image processing circuit 130 may be configured to perform an interpolation operation on the image signals RDOUTs to generate another converted image frame in a high illumination mode in comparison with the image frame generated in the low illumination mode. This ability for the image processing circuit 130 to process the digital image signals RDOUTs in different modes allows improved image reconstruction in such a device.

Figure 2:
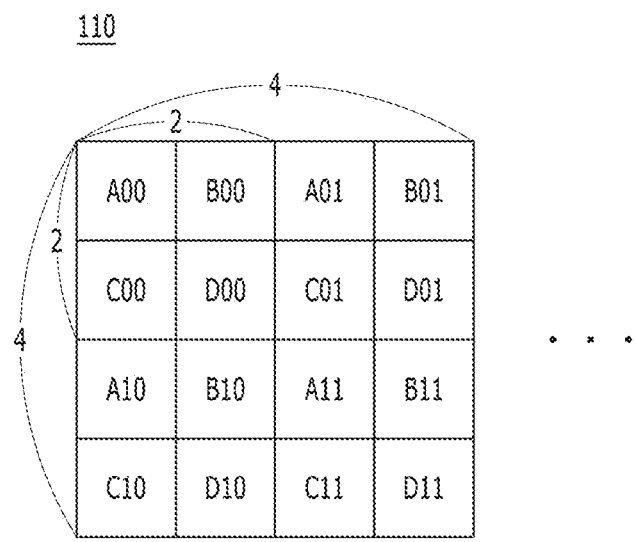
FIG. 2 is a diagram illustrating an example of a pixel array shown in FIG. 1.

FIG. 2 is a diagram illustrating an example of the pixel array 110 shown in FIG. 1 showing pixels arranged as a 2-dimensional array.

Referring to FIG. 2, pixels of the pixel array 110 in the illustrated example are arranged in row and column directions. Adjacent pixels of a selected number in the pixel array 110 may be grouped together to form a pixel group or a pixel unit so that the pixel array 110 can be viewed as an array of pixel units where each pixel unit further includes selected adjacent pixels. For example, each pixel unit may include 16 adjacent pixels as shown in FIG. 2 as a 4 by 4 pixel unit. As such, the pixel array 110 is formed by a repeating pattern of 4×4 pixel units that are tiled together. Accordingly, each pixel unit has 16 pixels which are arranged in a particular pattern as shown in FIG. 2. In general, adjacent pixels that are grouped to form a pixel unit may be in a selected pattern so that the corresponding color filters on top of the pixels within each pixel unit for a color pixel based on a particular color filter pattern. The constituent pixels grouped in one pixel unit may have arranged in a pattern (hereinafter, referred to as a "new pattern") that may represent a color pattern of a color filter array for arranging color filters, for example, red, green, and blue (RGB) color filters in the pixel array 110.

Figure 3:
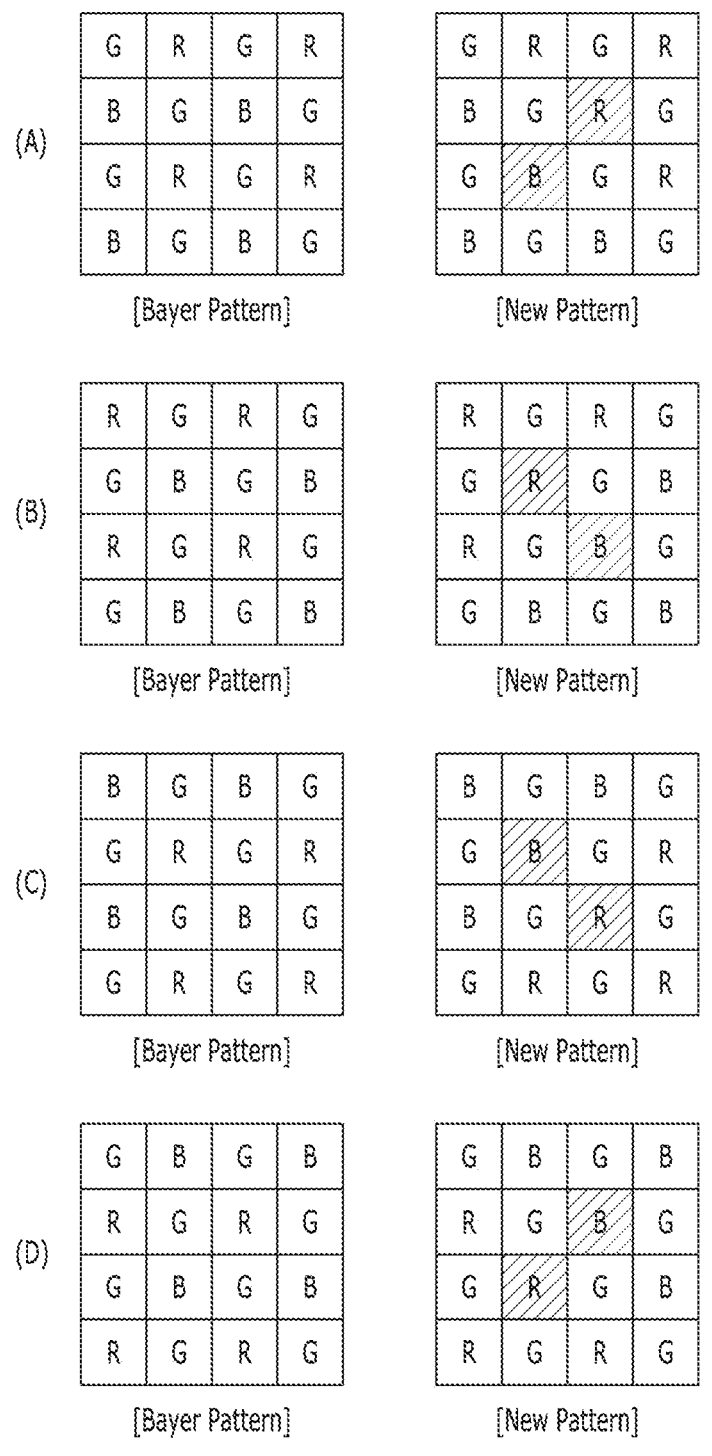

In the illustrated example in FIG. 2, each 4×4 pixel unit may include first to fourth sub-pixel arrays Aij, Bij, Cij and Dij of 2×2 pixels, where i and j are integers. In the example in FIG. 2, the one 4×4 pixel unit as shown includes four sub pixel arrays with each having four pixels Aij, Bij, Cij and Dij: a top left sub-pixel array having first to fourth pixels A00, B00, C00 and D00, a top right sub-pixel array having pixels A01, B01, C01 and D01, a bottom left sub-pixel array having pixels A10, B10, C10 and D10, and a bottom right sub-pixel array having pixels A11, B11, C11 and D11. The first and second pixels A00 and B00 and the third and fourth pixels C00 and D00 may be arranged immediately adjacent to each other in the row direction, respectively, and the first and third pixels A00 and C00 and the second and fourth pixels B00 and D00 may be arranged immediately adjacent to each other in the column direction, respectively. Consequently, the first pixel A00 and the fourth pixel D00 may be arranged facing each other in a diagonal direction, and the second pixel B00 and the third pixel C00 may be arranged facing each other on the other corners. In this example, the first and second sub-pixel arrays may be arranged in the same way based on a particular color filter pattern such as a Bayer pattern with 2 green pixels, 1 red pixel and 1 blue pixel, and the third and fourth sub-pixel arrays may be arranged in different color filter patterns. The first and second sub-pixel arrays may be arranged in a first diagonal direction, and the third and fourth sub-pixel arrays may be arranged in a second diagonal direction intersecting the first diagonal direction. Hereinafter, it is assumed that four sub-pixel arrays of the 4×4 pixel unit constitute a plane consisting of first to fourth quadrants. In FIGS. 2 and 3, a top-right region of the 4×4 pixel unit is referred to as "top-right quadrant," a bottom-right region is referred to as "bottom-right quadrant," a bottom-left region is referred to as "bottom-left quadrant," and a top-left region is referred to as "top-left quadrant."

FIG. 3 is a set of diagrams comparing example patterns of the 4×4 pixel unit in accordance with an embodiment of the disclosed technology with their corresponding Bayer patterns. The Bayer pattern may have a repeating pattern of a 2×2 pixel unit, and FIG. 3 illustrates the Bayer pattern of a 4×4 pixel unit, which corresponds to the new pattern.

Referring to FIG. 3(A), color pixels of the Bayer pattern are arranged such that each 2×2 pixel unit (i.e., 2×2 sub-pixel array) has a pair of green color pixels G arranged diagonally from the top left to the bottom right of each 2×2 pixel unit and a blue color pixel B and a red color pixel R alternately arranged diagonally from the bottom left to the top right of each 2×2 pixel unit.

The new pattern disclosed in this patent document is different from the Bayer pattern as shown in FIG. 3(A). The top left 2×2 sub-pixel array and the bottom right 2×2 sub-pixel array may be arranged in the same pattern as the Bayer pattern, and the top right 2×2 sub-pixel array and the bottom left 2×2 sub-pixel array may be arranged in different patterns from the Bayer pattern. The top right 2×2 sub-pixel array may correspond to an odd-numbered sub-pixel array on a basis of the row direction and correspond to an even-numbered sub-pixel array on a basis of the column direction. The bottom left 2×2 sub-pixel array may correspond to an even-numbered sub-pixel array on the basis of the row direction and correspond to an odd-numbered sub-pixel array on the basis of the column direction. Since the top left 2×2 sub-pixel array and the bottom right 2×2 sub-pixel array are arranged in the same way as the Bayer pattern, detailed descriptions thereof are omitted. The bottom left 2×2 sub-pixel array of the new pattern in FIG. 3(A) may include a pair of green color pixels G arranged diagonally from the top left to the bottom right of the bottom left 2×2 sub-pixel array and a pair of blue color pixels B arranged diagonally from the bottom left to the top right of the bottom left 2×2 sub-pixel array. The top right pixel of the bottom left 2×2 sub-pixel array of the new pattern in FIG. 3(A) has a different color from the Bayer pattern. The top right 2×2 sub-pixel array of the new pattern in FIG. 3(A) may include a pair of green color pixels G arranged diagonally from the top left to the bottom right of the top right 2×2 sub-pixel array and a pair of red color pixels R arranged diagonally from the bottom left to the top right of the top right 2×2 sub-pixel array. The bottom left pixel of the top right 2×2 sub-pixel array of the new pattern in FIG. 3(A) has a different color from the Bayer pattern. The new pattern may have different colors from vertically and horizontally adjacent pixels, and include 50% green color pixels G, 25% red color pixels R and 25% blue color pixels B.

Each of the sub-pixel arrays may include adjacent pixels of the same color. For example, in the new pattern shown in FIG. 3(A), each of the top left sub-pixel array and the bottom right sub-pixel array may include two green color pixels G disposed adjacent to each other in a diagonal direction, the bottom left sub-pixel array may include two blue color pixels B disposed adjacent to each other in the second diagonal direction, and the top right sub-pixel array may include two red color pixels R disposed adjacent to each other in the second diagonal direction. The new pattern in FIG. 3(A) based on the disclosed technology has the same color pixels arranged diagonally from the center of a pixel unit of 4×4 pixels. For example, the new pattern has two green pixels arranged diagonally from the center to the top left of the 4×4 pixel unit, two red pixels arranged diagonally from the center to the top right of the 4×4 pixel unit, another two green pixels arranged diagonally from the center to the bottom right of the 4×4 pixel unit, and two blue pixels arranged diagonally from the center to the bottom left of the 4×4 pixel unit. In this way, the new pattern implemented based on the disclosed technology may improve a signal to noise ratio (SNR) in a low illumination mode by summing same color pixels along the four diagonal directions.

Referring to FIG. 3(B), color pixels of the Bayer pattern are arranged such that each 2×2 pixel sub array has a pair of green color pixels G arranged diagonally from the top right to the bottom left of each 2×2 pixel sub array and a red color pixel R and a blue color pixel B alternately arranged diagonally from the top left to the bottom right of each 2×2 pixel sub array.

The new pattern disclosed in this patent document is different from the Bayer pattern as shown in FIG. 3(B). The top right 2×2 sub-pixel array and the bottom left 2×2 sub-pixel array may be arranged in the same pattern as the Bayer pattern, and the top left 2×2 sub-pixel array and the bottom right 2×2 sub-pixel array may be arranged in different patterns from the Bayer pattern. The top left 2×2 sub-pixel array may correspond to an odd-numbered sub-pixel array on a basis of the row direction and correspond to an odd-numbered sub-pixel array on a basis of the column direction. The bottom right 2×2 sub-pixel array may correspond to an even-numbered sub-pixel array on the basis of the row direction and correspond to an even-numbered sub-pixel array on the basis of the column direction. Since the top right 2×2 sub-pixel array and the bottom left 2×2 sub-pixel array are arranged in the same way as the Bayer pattern, detailed descriptions thereof are omitted. The top left 2×2 sub-pixel array of the new pattern in FIG. 3(B) may include a pair of green color pixels G arranged diagonally from the bottom left to the top right of the top left 2×2 sub-pixel array and a pair of red color pixels R arranged diagonally from the top left to the bottom right of the top left 2×2 sub-pixel array. The bottom right pixel of the top left 2×2 sub-pixel array of the new pattern in FIG. 3(B) has a different color from the Bayer pattern. The bottom right 2×2 sub-pixel array of the new pattern in FIG. 3(B) may include a pair of green color pixels G arranged diagonally from the bottom left to the top right of the top right 2×2 sub-pixel array and a pair of blue color pixels B arranged diagonally from the top left to the bottom right of bottom right 2×2 sub-pixel array. The top left pixel of the bottom right 2×2 sub-pixel array has a different color from the Bayer pattern. The new pattern may have different colors from vertically and horizontally adjacent pixels, and include 50% green color pixels G, 25% red color pixels R and 25% blue color pixels B (i.e., the ratio of G:R:B is 2:1:1).

Each of the sub-pixel arrays may include adjacent pixels of the same color. For example, in the new pattern shown in FIG. 3(B), each of the top right sub-pixel array and the bottom left sub-pixel array may include two green color pixels G disposed adjacent to each other in a diagonal direction, the top left sub-pixel array may include two red color pixels R disposed adjacent to each other in the first diagonal direction, and the bottom right sub-pixel array may include two blue color pixels B disposed adjacent to each other in the first diagonal direction. Hence, the new pattern in FIG. 3(B), the new pattern implemented based on the disclosed technology has the same color pixels arranged diagonally from the center of the 4×4 pixel unit. For example, the new pattern has two green pixels arranged diagonally from the center to the top right of the 4×4 pixel unit, two red pixels arranged diagonally from the center to the top left of the 4×4 pixel unit, another two green pixels arranged diagonally from the center to the bottom left of the 4×4 pixel unit, and two blue pixels arranged diagonally from the center to the bottom right of the 4×4 pixel unit. In this way, the new pattern implemented based on the disclosed technology may improve a signal to noise ratio (SNR) in a low illumination mode by summing same color pixels along the four diagonal directions.

Referring to FIG. 3(C), color pixels of the Bayer pattern are arranged such that each 2×2 sub-pixel array has a pair of green color pixels G arranged diagonally from the top right to the bottom left of each 2×2 pixel unit and a blue color pixel B and a red color pixel R alternately arranged diagonally from the top left to the bottom right of each 2×2 pixel sub array.

The new pattern disclosed in this patent document is different from the Bayer pattern as shown in FIG. 3(C). The top right 2×2 sub-pixel array and the bottom left 2×2 sub-pixel array may be arranged in the same pattern as the Bayer pattern, and the top left 2×2 sub-pixel array and the bottom right 2×2 sub-pixel array may be arranged in different patterns from the Bayer pattern. The top left 2×2 sub-pixel array may correspond to an odd-numbered sub-pixel array on a basis of the row direction and correspond to an odd-numbered sub-pixel array on a basis of the column direction. The bottom right 2×2 sub-pixel array may correspond to an even-numbered sub-pixel array on the basis of the row direction and correspond to an even-numbered sub-pixel array on the basis of the column direction. Since the top right 2×2 sub-pixel array and the bottom left 2×2 sub-pixel array are arranged in the same way as the Bayer pattern, detailed descriptions thereof are omitted. The top left 2×2 sub-pixel array of the new pattern in FIG. 3(C) may include a pair of green color pixels G arranged diagonally from the bottom left to the top right of the top left 2×2 sub-pixel array and a pair of blue color pixels B arranged diagonally from the top left to the bottom right of the top left 2×2 sub-pixel array. The bottom right pixel of the top left 2×2 sub-pixel array of the new pattern in FIG. 3(C) has a different color from the Bayer pattern. The bottom right 2×2 sub-pixel array of the new pattern in FIG. 3(C) may include a pair of green color pixels G arranged diagonally from the bottom left to the top right of the top right 2×2 sub-pixel array and a pair of red color pixels R arranged diagonally from the top left to the bottom right of bottom right 2×2 sub-pixel array. The top left pixel of the bottom right 2×2 sub-pixel array has a different color from the Bayer pattern. The new pattern may have different colors from vertically and horizontally adjacent pixels, and include 50% green color pixels G, 25% red color pixels R and 25% blue color pixels B.

Each of the sub-pixel arrays may include adjacent pixels of the same color. For example, in the new pattern shown in FIG. 3(C), each of the top right sub-pixel array and the bottom left sub-pixel array may include two green color pixels G disposed adjacent to each other in a diagonal direction, the top left sub-pixel array may include two blue color pixels B disposed adjacent to each other in the first diagonal direction, and the bottom right sub-pixel array may include two red color pixels R disposed adjacent to each other in the first diagonal direction. The new pattern in FIG. 3(C) based on the disclosed technology has the same color pixels arranged diagonally from the center of the 4×4 pixel array. For example, the new pattern has two green pixels arranged diagonally from the center to the top right of the 4×4 pixel array, two blue pixels arranged diagonally from the center to the top left of the 4×4 pixel array, another two green pixels arranged diagonally from the center to the bottom left of the 4×4 pixel array, and two red pixels arranged diagonally from the center to the bottom right of the 4×4 pixel array. In this way, the new pattern implemented based on the disclosed technology may improve a signal to noise ratio (SNR) in a low illumination mode by summing same color pixels along the four diagonal directions.

Referring to FIG. 3(D), color pixels of the Bayer pattern are arranged such that each 2×2 sub-pixel array has a pair of green color pixels G arranged diagonally from the top left to the bottom right of each 2×2 sub pixel array, a red color pixel R and a blue color pixel B may be alternately arranged diagonally from the bottom left to the top right of each 2×2 sub pixel array.

The new pattern disclosed in this patent document is different from the Bayer pattern as shown in FIG. 3(D). The top left 2×2 sub-pixel array and the bottom right 2×2 sub-pixel array may be arranged in the same pattern as the Bayer pattern, and the top right 2×2 sub-pixel array and the bottom left 2×2 sub-pixel array may be arranged in different patterns from the Bayer pattern. The top right 2×2 sub-pixel array may correspond to an odd-numbered sub-pixel array on a basis of the row direction and correspond to an even-numbered sub-pixel array on a basis of the column direction. The bottom left 2×2 sub-pixel array may correspond to an even-numbered sub-pixel array on the basis of the row direction and correspond to an odd-numbered sub-pixel array on the basis of the column direction. Since the top left 2×2 sub-pixel array and the bottom right 2×2 sub-pixel array are arranged in the same way as the Bayer pattern, detailed descriptions thereof are omitted. The bottom left 2×2 sub-pixel array of the new pattern in FIG. 3(D) may include a pair of green color pixels G arranged diagonally from the top left to the bottom right of the bottom left 2×2 sub-pixel array and a pair of red color pixels R arranged diagonally from the bottom left to the top right of the bottom left 2×2 sub-pixel array. The top right pixel of bottom left 2×2 sub-pixel array of the new pattern in FIG. 3(D) has a different color from the Bayer pattern. The top right 2×2 sub-pixel array of the new pattern in FIG. 3(D) may include a pair of green color pixels G arranged diagonally from the top left to the bottom right of the top right 2×2 sub-pixel array and a pair of blue color pixels B arranged diagonally from the bottom left to the top right of the top right 2×2 sub-pixel array. The bottom left pixel of the top right 2×2 sub-pixel array of the new pattern in FIG. 3(B) has a different color from the Bayer pattern. The new pattern may have different colors from vertically and horizontally adjacent pixels, and include 50% green color pixels G, 25% red color pixels R and 25% blue color pixels B.

Each of the sub-pixel arrays may include adjacent pixels of the same color. For example, in the new pattern shown in FIG. 3(D), each of the top left sub-pixel array and the bottom right sub-pixel array may include two green color pixels G disposed adjacent to each other in a diagonal direction, the bottom left sub-pixel array may include two red color pixels R disposed adjacent to each other in the second diagonal direction, and the top right sub-pixel array may include two blue color pixels B disposed adjacent to each other in the second diagonal direction. To put it another way, looking at the new pattern in FIG. 3(D), the new pattern implemented based on the disclosed technology has the same color pixels arranged diagonally from the center of the 4×4 pixel array. For example, the new pattern has two green pixels arranged diagonally from the center to the top left of the 4×4 pixel array, two blue pixels arranged diagonally from the center to the top right of the 4×4 pixel array, another two green pixels arranged diagonally from the center to the bottom right of the 4×4 pixel array, and two red pixels arranged diagonally from the center to the bottom left of the 4×4 pixel array. In this way, the new pattern implemented based on the disclosed technology may improve a signal to noise ratio (SNR) in a low illumination mode by summing same color pixels along the four diagonal directions.

In one aspect of the disclosed technology, an image sensing device may include an array of light-sensitive elements such as the photosensing pixels discussed above. The array may include a first type of light-sensitive elements sensitive in a green region of a spectrum of the light, arranged at every other element position along both a vertical direction and a horizontal direction, and a second type of light-sensitive elements sensitive in a red region of a spectrum of the light and a third type of light-sensitive elements sensitive in a blue region of a spectrum of the light, each of the second and third type of light-sensitive elements being arranged at an element position surrounded by four light-sensitive elements of the first type. A part of the array of the second and third types of light-sensitive elements is arranged such that the second and third types of light-sensitive elements are alternately arranged along a plurality of first diagonal lines, and the other part of the array of the second and third types of light-sensitive elements is arranged such that two consecutive second types of light-sensitive elements and two consecutive third types of light-sensitive elements are alternately arranged along a plurality of second diagonal lines, each of which is arranged between two adjacent first diagonal lines.

Figure 4:
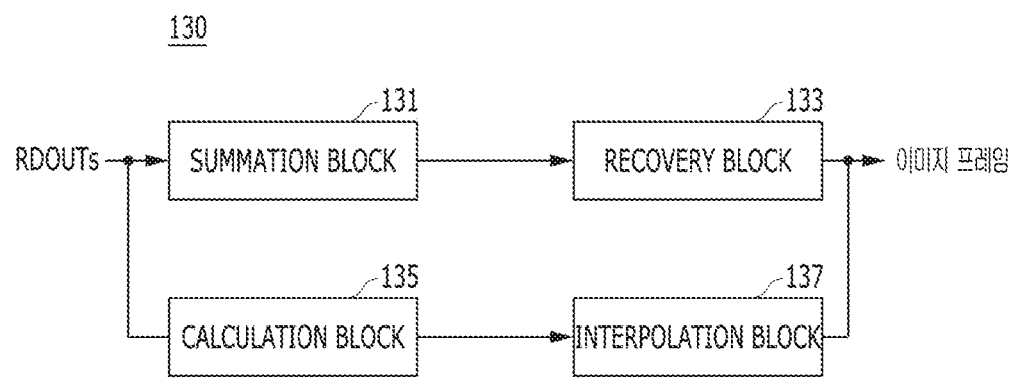
FIG. 4 is a block diagram illustrating an example of an image processing circuit shown in FIG. 1.

FIG. 4 is a block diagram illustrating an example of the image processing circuit 130 shown in FIG. 1.

Referring to FIG. 4, the image processing circuit 130 may include a summation block 131, a recovery block 133, a calculation block 135, and an interpolation block 137.

The summation block 131 may combine image signals from the same color pixels for each sub-pixel array among the image signals RDOUTs to generate a pre-image frame, which is a downscaled image. For example, the summation block 131 may generate the pre-image frame, which is downscaled into a 2×2 pixel unit based on the image signals of the 4×4 pixel unit.

The recovery block 133 may generate the image frame by upscaling the pre-image frame in the low illumination mode. For example, the recovery block 133 may generate the image frame by upscaling the pre-image frame, which was downscaled into the 2×2 sub pixel array size, to the 4×4 pixel unit size through an interpolation operation. The interpolation operation for upscaling the pre-image frame may be different from an interpolation operation of the interpolation block 137, which is to be described below. Since the interpolation operation for upscaling the pre-image is widely known to those skilled in the art, a description thereof is omitted herein.

The calculation block 135 may calculate gradients of respective target image signals among the image signals RDOUTs in the high illumination mode. For example, the calculation block 135 may calculate first to fourth gradients corresponding to different directions based on neighboring image signals of each target image signal, and provide a gradient having a minimum value among the first to fourth gradients to the interpolation block 137.

The interpolation block 137 may interpolate the target image signals based on the gradients, e.g., the gradient having the minimum value in the high illumination mode to generate the image frame under the high illumination mode.

Figure 5:
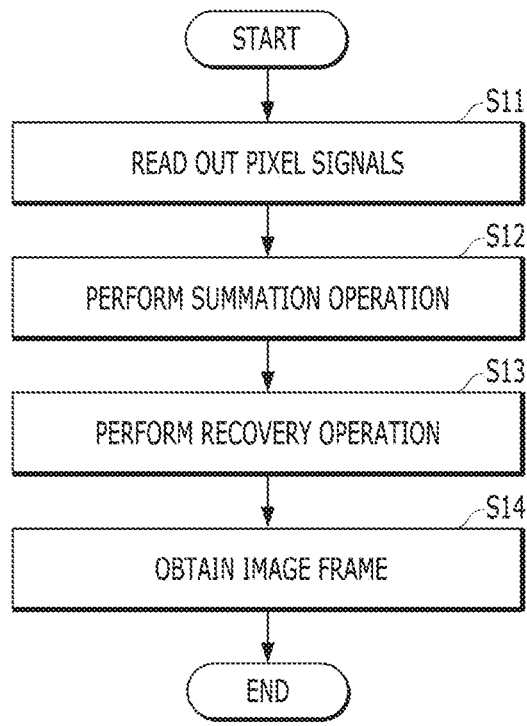
FIG. 5 is a flowchart illustrating an example operation of an image sensing device in a low illumination mode.

FIG. 5 is a flowchart illustrating an example operation in the low illumination mode of the image sensing device 100 shown in FIG. 1.

Referring to FIG. 5, in step S11, the pixel array 110 may generate the pixel signals PXOUTs, which are analog signals, based on sensed images under a low illumination circumstance, and the readout circuit 120 may generate the image signals RDOUTs, which are digital signals, based on the pixel signals PXOUTs.

In step S12, the summation block 131 may combine the image signals having the same color for each sub-pixel array among the image signals RDOUTs so as to generate the pre-image frame which is down scaled.

In steps S13 and S14, the recovery block 133 may upscale the pre-image frame so as to generate the image frame under the low illumination mode.

Figure 6:
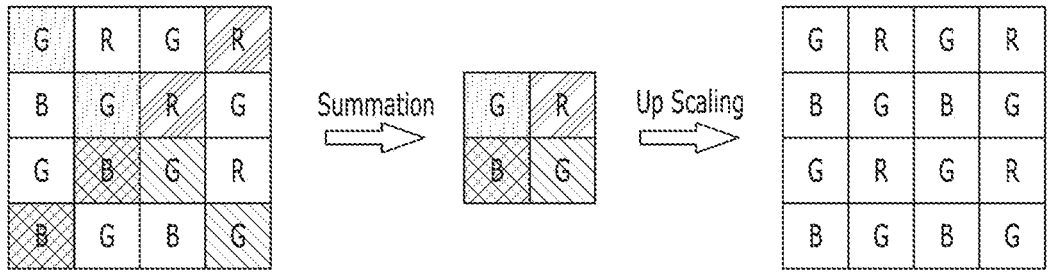
FIG. 6 is a diagram for describing a summation operation process and a recovery operation process shown in FIG. 5.

FIG. 6 is a diagram for describing an operation of the summation block 131 and an operation of the recovery block 133 shown in FIG. 5. For the sake of convenience in description, FIG. 6 representatively illustrates the new pattern shown in FIG. 3(A).

Referring to FIG. 6, the summation block 131 may combine two image signals that are read out from the two red color pixels R arranged in the top right quadrant among the image signals of the 4×4 pixel unit, combine two image signals that are read out from the two green color pixels G arranged in the top left quadrant among the image signals of the 4×4 pixel unit, combine two image signals that are read out from the two blue color pixels B arranged in the bottom left quadrant among the image signals of the 4×4 pixel unit, and combine two image signals that are read out from the tow green color pixels G arranged in the bottom right quadrant among the image signals of the 4×4 pixel unit, thereby generating the pre-image frame which is down-scaled into the 2×2 pixel unit size. The pre-image frame which is downscaled into the 2×2 pixel unit size may have the Bayer pattern.

The recovery block 133 may generate the image frame by upscaling the pre-image frame, which was downscaled into the 2×2 pixel unit size, to the 4×4 pixel unit size through the interpolation operation. The image frame may be arranged in the Bayer pattern of the 2×2 pixel unit.

Figure 7:
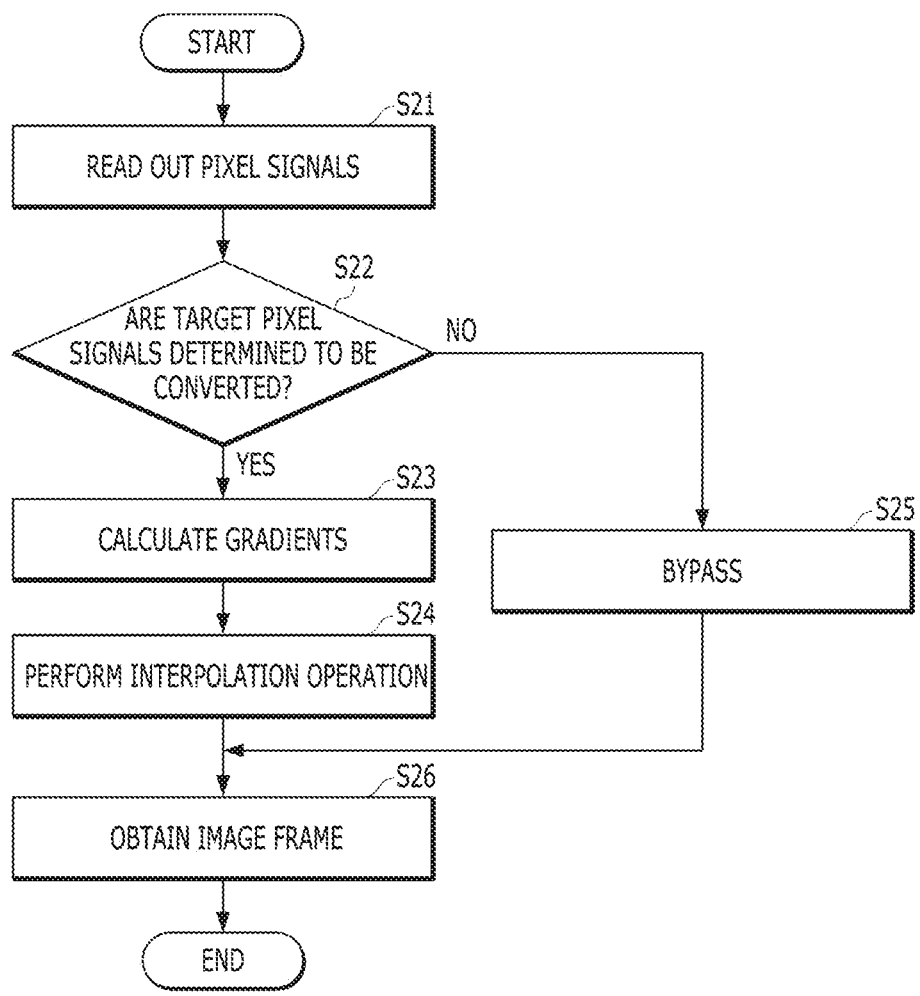
FIG. 7 is a flowchart illustrating an example operation of an image sensing device in a high illumination mode.

FIG. 7 is a flowchart illustrating an example operation of the image sensing device 100 in the high illumination mode.

The referring to FIG. 7, in step S21, the pixel array 110 may generate the pixel signals PXOUTs, which are analog signals, based on sensed images under a high illumination circumstance, and the readout circuit 120 may generate the image signals RDOUTs, which are digital signals, based on the pixel signals PXOUTs.

The image processing circuit 130 may determine target image signals among the image signals RDOUTs in step S22, and may convert the target image signals according to the Bayer pattern based on a result of the determination in steps S23 and S24. For example, the calculation block 135 may calculate gradients with respect to two target image signals among 16 image signals corresponding to the pixel array of the 4×4 pixel unit in step S23, and the interpolation block 137 may perform an interpolation for the two target image signals based on the gradients of each target image signal in step S24. The two target image signals may correspond to the pixels filled with diagonal lines shown in FIG. 3. The two image signals may include one image signal corresponding to the red color R and one image signal corresponding to the blue color B.

The image processing circuit 130 may bypass the image processing (e.g., interpolation) with respect to remaining image signals among the image signals RDOUTs in step S25. For example, the image processing circuit 130 may bypass the image processing with respect to remaining 14 image signals among the 16 image signals corresponding to the pixel array of the 4×4 pixel unit.

Consequently, the image processing circuit 130 may generate the image frame under the high illumination mode based on the interpolated image signals and the bypassed image signals in step S26. The image frame may be arranged in the Bayer pattern of the 2×2 pixel unit.

FIG. 8 is a diagram for describing a gradient calculation step S23 and an interpolation operation step S24 shown in FIG. 7.

Referring to FIG. 8, the gradients may be calculated within a 5×5 kernel on a basis of each of the target image signals. For example, the gradients of a red color target image signal Rt may be calculated by the following Equation 1.

$$\text{grad } h = ah*|B5-B4|+bh*|G3-G2| \text{ grad } v = av*|B7-B2|+bv*|G4-G1| \text{ grad } s = as*|B6-B3|+bs*|G2-G1|+cs*|G4-G3| \text{ grad } b = ab*|B8-B1|+bb*|G3-G1|+cb*|G4-G2| \quad \text{[Equation 1]}$$

Here, "grad h" is a first gradient in a horizontal direction, "ah" and "bh" are weight coefficients in the horizontal direction, "grad v" is a second gradient in a vertical direction, "av" and "bv" are weight coefficients in the vertical direction, "grad s" is a third gradient in a first diagonal direction, "as", "bs" and "cs" are weighting coefficients in the first diagonal direction, "grad b" is a fourth gradient in a second diagonal direction, and "ab", "bb" and "cb" are weight coefficients in the second diagonal direction.

The calculation block 135 may calculate the first to fourth gradients of the red color target image signal Rt through Equation 1, and may provide a minimum gradient among the first to fourth gradients to the interpolation block 137.

The interpolation block 137 may perform an interpolation for the red color target image signal Rt based on the following Equation 2.

$$\text{Hor } Rt = (B4+B5)/2 \text{ Ver } Rt = (B2-B7)/2 \text{ Slash } Rt = (B3+B6)/2 \text{ Backslash } Rt = (B1+B8)/2 \quad \text{[Equation 2]}$$

Here, "Hor Rt" is a first interpolation result in the horizontal direction, "Ver Rt" is a second interpolation result in the vertical direction, "Slash Rt" is a third interpolation result in the first diagonal direction, and "Backslash Rt" is a fourth interpolation result in the second diagonal direction.

The interpolation block 137 may generate any one of the first to fourth interpolation results based on the minimum gradient. For example, the interpolation block 137 may generate the third interpolation result when the third gradient is inputted as the minimum gradient.

Therefore, the red color target image signal Rt may be interpolated to the blue color B. As the blue color B exists in all directions around the red color target image signal Rt, excellent interpolation results may be obtained.

A blue color target image signal Bt may be calculated by Equations 1 and 2 within the 5×5 kernel on a basis of the blue color target image signal Bt.

In accordance with the embodiment of the present invention, a pixel array in a new pattern is proposed, whereby a condition for performing a summation operation for each sub-pixel array in a low illumination mode may be provided, and the number of interpolated signals corresponding to a Bayer pattern in a high illumination mode may be minimized.

Also, in accordance with the embodiment of the present invention, a pixel array in a new pattern is proposed, whereby a signal-to-noise ratio (SNR) in a low illumination mode may be improved, and high-solution pixels in a high illumination mode may be supported.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve described results. Moreover, the separation of various system components in the embodiments described in this patent document should not be understood as requiring such separation in all embodiments. Only a few implementations and examples are described. Other implementations, enhancements and variations can be made based on what is described and illustrated in this patent document.

What is claimed is:

1. An image sensing device, comprising:
   a pixel array of a 4×4 pixel unit including first to fourth sub-pixel arrays of 2×2 sub-pixel arrays, the first and second sub-pixel arrays being arranged in a first diagonal direction, the third and fourth sub-pixel arrays being arranged in a second diagonal direction intersecting the first diagonal direction,
   wherein the first and second sub-pixel arrays have a first color pattern, the third sub-pixel array has a second color pattern, the fourth sub-pixel array has a third color pattern different from the second color pattern, and each of the first to third color patterns includes two or more colors,
   wherein a part of each of the second and third color patterns has a different color arrangement from the first color pattern.

2. The image sensing device of claim 1, wherein the first color pattern is different from the second and third color patterns.

3. The image sensing device of claim 1, wherein the first color pattern includes a Bayer pattern.

4. The image sensing device of claim 1, wherein color pixels of the first color pattern are arranged such that each 2×2 sub-pixel array has a pair of green color pixels arranged in the first diagonal direction or the second diagonal direction, and a red color pixel and a blue color pixel arranged in a diagonal direction intersecting the diagonal direction in which the pair of green color pixels are arranged.

5. The image sensing device of claim 4, wherein color pixels of each of the second and third color patterns are arranged such that each 2×2 sub-pixel array has a pair of green color pixels arranged in the same diagonal direction as the diagonal direction in which the pair of green color pixels are arranged in the first color pattern, and a pair of blue color pixels or a pair of red color pixels arranged in a diagonal direction intersecting the direction in which the pair of green color pixels are arranged.

6. The image sensing device of claim 1, wherein pixels disposed immediately adjacent to each other in the first diagonal direction have the same color as each other.

7. The image sensing device of claim 1, wherein each pixel included in the pixel array of the 4×4 pixel unit has a different color from vertically and horizontally adjacent pixels.

8. The image sensing device of claim 1, wherein the pixel array of the 4×4 pixel unit includes one or more green color pixels, one or more red color pixels, and one or more blue color pixels, and wherein a ratio of the green color pixel, the red color pixel and the blue color pixel in the pixel array of the 4×4 pixel unit is 2:1:1.

9. The image sensing device of claim 1, further comprising:
   a readout circuit suitable for reading out pixel signals from the pixel array; and
   an image processing circuit suitable for generating a first image frame converted into a different pattern from the pixel array of the 4×4 pixel unit through a summation operation based on the pixel signals, in a low illumination mode.

10. The image sensing device of claim 9, wherein the image processing circuit includes:
    a summation block suitable for combining pixel signals from the same color pixels for each sub-pixel array among the pixel signals to generate a pre-image frame, which is a downscaled image, in the low illumination mode; and
    a recovery block suitable for upscaling the pre-image frame to generate the first image frame in the low illumination mode.

11. The image sensing device of claim 9, wherein the image processing circuit combines two pixel signals having the same color for each sub-pixel array among the pixel signals.

12. The image sensing device of claim 9, wherein the image processing circuit combines two pixel signals corresponding to a green color among four pixel signals that are read out from the first sub-pixel array, combines two pixel signals corresponding to a green color among four pixel signals that are read out from the second sub-pixel array, combines two pixel signals corresponding to a red color among four pixel signals that are read out from the third sub-pixel array, and combines two pixel signals corresponding to a blue color among four pixel signals that are read out from the fourth sub-pixel array.

13. The image sensing device of claim 9, wherein the image processing circuit generates a second image frame converted into a different pattern through an interpolation operation based on the pixel signals, in a high illumination mode.

14. The image sensing device of claim 13, wherein the image processing circuit includes:
    a calculation block suitable for calculating gradients of target pixel signals among the pixel signals in the high illumination mode; and
    an interpolation block suitable for performing an interpolation for the target pixel signals based on the gradients to generate the second image frame in the high illumination mode.

15. The image sensing device of claim 13, wherein:
    the first color pattern includes a Bayer pattern; and the image processing circuit interpolates two pixel signals among 16 pixel signals that are read out from the pixel array of the 4×4 pixel unit and bypasses an image processing with respect to remaining 14 pixel signals to generate the second image frame in the high illumination mode.

16. The image sensing device of claim 15, wherein the two pixel signals include one pixel signal corresponding to a red color and one pixel signal corresponding to a blue color.

17. The image sensing device of claim 1, further comprising:
   a readout circuit suitable for reading out pixel signals from the pixel array; and
   an image processing circuit suitable for generating an image frame converted into a different pattern from the pixel array of the 4×4 pixel unit through an interpolation operation based on the pixel signals in a high illumination mode.

18. The image sensing device of claim 17, wherein the image processing circuit includes:
   a calculation block suitable for calculating gradients of target pixel signals among the pixel signals; and
   an interpolation block suitable for performing an interpolation for the target pixel signals based on the gradients to generate the image frame.

19. The image sensing device of claim 17, wherein:
   the first color pattern includes a Bayer pattern; and
   the image processing circuit interpolates two pixel signals among 16 pixel signals that are read out from the pixel array of the 4×4 pixel unit and bypasses an image processing with respect to remaining 14 pixel signals so as to generate the image frame in the high illumination mode.

20. The image sensing device of claim 19, wherein the two pixel signals include one pixel signal corresponding to a red color and one pixel signal corresponding to a blue color.

21. An image sensing device, comprising:
   a pixel array including sub-pixel arrays arranged in i rows and j columns, in which $A_{ij}$, $B_{ij}$, $C_{ij}$ and $D_{ij}$ (where i and j are integers) pixels are arranged in 2×2 units, the $A_{ij}$ and $B_{ij}$ pixels and the $C_{ij}$ and $D_{ij}$ pixels are arranged adjacent to each other in a row direction, respectively, and the $A_{ij}$ and $C_{ij}$ pixels and the $B_{ij}$ and $D_{ij}$ pixels are arranged adjacent to each other in a column direction, respectively,
   wherein each of two pixels among the $A_{ij}$, $B_{ij}$, $C_{ij}$ and $D_{ij}$ pixels has a green color, and each of remaining two pixels has one or more colors other than the green color, and
   the remaining two pixels among the $A_{ij}$, $B_{ij}$, $C_{ij}$ and $D_{ij}$ pixels included in each of odd-numbered sub-pixel arrays and one of even-numbered sub-pixel arrays are disposed adjacent to each other in a diagonal direction and have the same color, and
   the remaining two pixels among the $A_{ij}$, $B_{ij}$, $C_{ij}$ and $D_{ij}$ pixels included in each of the remaining one of the odd-numbered sub-pixel arrays and the remaining one of the even-numbered sub-pixel arrays are disposed adjacent to each other in the diagonal direction and have different colors.

22. The image sensing device of claim 21, wherein the odd-numbered sub-pixel arrays or the even-numbered sub-pixel arrays are defined on a basis of the row direction or the column direction.

23. The image sensing device of claim 21, wherein the same color includes a red color or a blue color.

24. An image sensing device comprising an array of light-sensitive elements, the array includes:
   a first type of light-sensitive elements sensitive in a green region of a spectrum of the light, arranged at every other element position along both a vertical direction and a horizontal direction; and
   a second type of light-sensitive elements sensitive in a red region of a spectrum of the light and a third type of light-sensitive elements sensitive in a blue region of a spectrum of the light, each of the second and third type of light-sensitive elements being arranged at an element position surrounded by four light-sensitive elements of the first type,
   wherein a part of a color pattern of the second type of light-sensitive elements and a part of a color pattern of the third type of light-sensitive elements have different color arrangements from a color pattern of the first type of light-sensitive elements, and
   wherein a part of the array of the second and third types of light-sensitive elements is arranged such that the second and third types of light-sensitive elements are alternately arranged along a plurality of first diagonal lines, and the other part of the array of the second and third types of light-sensitive elements is arranged such that two consecutive second types of light-sensitive elements and two consecutive third types of light-sensitive elements are alternately arranged along a plurality of second diagonal lines, each of which is arranged between two adjacent first diagonal lines.

* * * * *